United States Patent [19]

McInnes

[11] 4,431,131
[45] Feb. 14, 1984

[54] HEATING ARRANGEMENTS AND CONTROL SYSTEMS THEREFOR

[75] Inventor: Malcolm B. McInnes, Blackburn, Australia

[73] Assignee: Pyrox Limited, Victoria, Australia

[21] Appl. No.: 283,197

[22] Filed: Jul. 14, 1981

[30] Foreign Application Priority Data

Jul. 15, 1980 [AU] Australia ............................. PE4537

[51] Int. Cl.³ .............................................. F23Q 1/00
[52] U.S. Cl. ...................................... 236/11; 62/175; 431/60; 236/78 C
[58] Field of Search ..................... 236/1 EB, 11, 78 C; 62/175; 431/60, 61; 307/39; 219/485, 486, 499; 165/25

[56] References Cited

U.S. PATENT DOCUMENTS

| | | | |
|---|---|---|---|
| 2,470,996 | 5/1949 | McGrath | 236/1 EB |
| 2,825,791 | 3/1958 | Jackson | 219/306 X |
| 3,714,980 | 2/1973 | Lancia et al. | 165/26 X |
| 3,844,475 | 10/1974 | Kesterson et al. | 236/1 EA |

FOREIGN PATENT DOCUMENTS 1335983 10/1973 United Kingdom.

Primary Examiner—William E. Wayner
Attorney, Agent, or Firm—Cushman, Darby & Cushman

[57] ABSTRACT

A control system for heating installations which is responsive to a pre-selected target air temperature and a pre-selected radiant heat output.

25 Claims, 5 Drawing Figures

HEATING ARRANGEMENTS AND CONTROL SYSTEMS THEREFOR

The present invention relates to heating arrangements and in one aspect to a control system for such heating arrangements. A particular form of control system according to the present invention has application in heating appliances suitable for domestic use. It is convenient to hereinafter describe the invention with reference to such domestic appliances although it should be appreciated that such application is not limiting on the present invention.

Domestic heating arrangements typically include one or more burners, a supply of fuel and a control system for controlling the supply of fuel to the burners. In a very simple electric heater for example a supply of electric current (fuel) to a radiator element (burner) is regulated by a switch (control system). In more elaborate gas-fired heaters for example, a supply of gas (fuel) to a combustion zone (burner) may be regulated by a control system which includes a valve operable in response to a signal from a thermostat.

It is well known that heating arrangements may discharge heat into a space by radiation and/or convection. Heating appliances which include a blower to circulate air which has been heated by passing close to a burner, typically operate in response to the air temperature within the space to be heated without taking into account the effect of any radiant heat output.

Heating control systems in such prior art heating appliances generally fail to take into account, the effect of the radiant heat output on the overall environment to be heated as they generally are controlled by monitoring only the ambient thermal state of the environment. When the radiant heat output of a heating system is not taken into account, the radiant heat at a given location in the environment being heated may exceed desired limits resulting in discomfort to the occupants. This is a result of the well known phenomenon that people generally feel comfortable at a lower air temperature where a source of radiant heat is present than in cases where there is no radiant heat source.

An object of the present invention is to alleviate the above-mentioned disadvantages of prior art heating arrangements.

The present invention accordingly provides, in one embodiment, a heating arrangement having a control system responsive to a pre-selected target air temperature and a pre-selected radiant heat output.

A control system according to the invention preferably comprises an air temperature control means for providing a signal indicative of a difference between an existing air temperature state and a pre-selected target air temperature state. A burner control means may be provided for receiving the signal. The burner control means may be operable to control a fuel control means for controlling the supply of fuel to one or more burners of the heating arrangement. The system may further include a radiant heat selector operable as an override mechanism with respect to the output of the burner control means whereby to constrain the fuel control means to operate within the limits imposed by activation of the radiant heat selector.

The present invention accordingly facilitates provision of a heater in which a desired maximum radiant heat output and a desired air temperature may be separately preselected and the effect of the control system is such that in attempting to reach the desired air temperature, the heater does not exceed the desired maximum radiant heat output. As can be appreciated by those skilled in the art the air temperature within the space being heated is dependent on the temperature of the heated air or "convection-heat" output of the heater. Accordingly, the air temperature may be sensed at a point adjacent the heated air outlet of the heater, at some other point on the heater or at a remote point elsewhere within the space being heated.

In one particularly preferred embodiment of the invention the control system comprises an air temperature control means for providing at least one error signal indicative of a difference between an existing temperature state and a temperature state to be attained by the heater, a burner control means for receiving the or each error signal and connected to a fuel control means for controlling the supply of fuel to one or more burners of the heating arrangement. This preferred system may further include a radiant heat selector interposed between the burner control means and fuel control means for controlling the passage of signals from the burner control means to the fuel control means.

The fuel control means of the present invention may additionally be adapted to activate a circulation means for circulating heated air within the environment being heated. The circulation means may comprise a blower. The blower is preferably an electrically operable fan which may be of the single speed, multispeed or variable speed type. Both axial and radial type fans may be used as blowers in accordance with the invention. The circulation means is preferably operably connectable to the control system in such a way that the circulation means operates whenever a burner is operating. The control system may include ignition means of any convenient form suitable for the type of fuel being used in the heating arrangement. Preferably the ignition means is activated on each occasion that fuel commences to flow through an unignited burner head.

The air temperature control means may be operable to sense differences between a prevailing air temperature within the environment to be heated and a desired temperature state. The desired temperature state may be selected manually. The air temperature control means preferably includes a temperature responsive element and a target temperature control element interconnected to provide a signal whenever the prevailing air temperature is lower than the selected temperature. In one preferred form of the invention the air temperature control means may comprise a wheat-stone bridge circuit having a temperature responsive transducer such as a thermister and a target temperature control element such as a variable resistor included in respective first and second arms of the bridge. The temperature responsive transducer element may have a positive or negative temperature coefficient. One or more resistance elements may be provided in series in a third arm of the bridge to provide one or more tapping points at their junctions, the purpose of which will be hereinafter described. The fourth arm of the bridge preferably includes a resistance element to balance the wheatstone bridge.

The bridge preferably has applied to it, an input D.C. voltage between the junctions of the first and second arms and the third and fourth arms. The bridge output may be obtained between the junctions of the first and fourth arms and the second and third arms. In a preferred embodiment of the present invention the bridge output signals are obtained from the bridge between the junction of the first and fourth arms and each respective tapping point previously referred to.

In this preferred embodiment, the output signals of the bridge correspond to the output signals of the air temperature control means and may advantageously by used to actuate the burner control means. In one preferred form, the burner control means includes a signal comparator means. The signal comparator means may comprise one or more differential amplifiers, the input of each differential amplifier respectively receiving an output signal of the air temperature control means. The wheatstone bridge preferably is arranged so that the null or balance signal of the bridge will shift from one junction point to the next in response to a change in the difference between the temperature of the air and the desired or target temperature state. It can be seen that the output of each differential amplifier in the burner control means may change state as the above-mentioned temperature difference takes place. Moreover, a change in output state of an amplifier may be maintained until such time as the temperature difference is reduced. A large difference between the temperature of the air and the selected temperature state may thus give rise to a corresponding large number of amplifiers changing their output states.

In this preferred embodiment the outputs of the above-mentioned differential amplifiers, correspond to the outputs of the burner control means and preferably pass through the radiant heat selector before entering the fuel control means. The radiant heat selector may accordingly serve as an override mechanism and thereby control or limit the action of the burner control means on the fuel control means.

In a preferred form the radiant heat selector includes at least one gate between each output of the burner control means and the fuel control means. The or each gate is adapted to receive at its input, an output of the burner control means and a gating signal from a control switch of the radiant heat selected. The or each gate is arranged such that signals from the burner control means will pass through the gate only when coincident with a gating signal from the control switch. The control switch may thus be used to effectively limit the number of control signals passing from the burner control means to the fuel control means.

In a preferred form the control switch may comprise a plurality of steering diodes and a rotary selector supplying the gating signal. In a further form of the invention the rotary selector may be replaced by an Integrated Circuit switching device having touch control switching inputs, such as, for example, a Texas Instruments Circuit type SN 29861.

The fuel control means preferably incorporates one or more burner circuits, each circuit being operably connectable to one or more fuel actuating means such as a solenoid fuel valve. Preferably two such fuel actuating means are connected to each burner circuit for actuating a pair of fuel valves. The or each fuel burner circuit may be actuated by the burner control means as modified by the radiant heat selector. In one preferred form of the control system of the present invention, each fuel burner circuit is actuated by an output signal of the burner control means gated through the radiant heat selector.

In a particular form of the present invention one of the burner circuits may be operably connectable to an ignition means for igniting the fuel burner heads. The ignition means may be of any convenient design suitable for the type of fuel used in the heating arrangement. Preferably the ignition means is activated on each occasion that fuel commences to flow through an unignited burner head. It is preferred that the ignition means be operably connectable to the first of the burner circuits to be actuated by the burner control means. The same burner circuit may advantageously be used to effect control of the circulation means.

A preferred embodiment of the present invention will now be described with reference to the enclosed drawings wherein.

Figure 1:
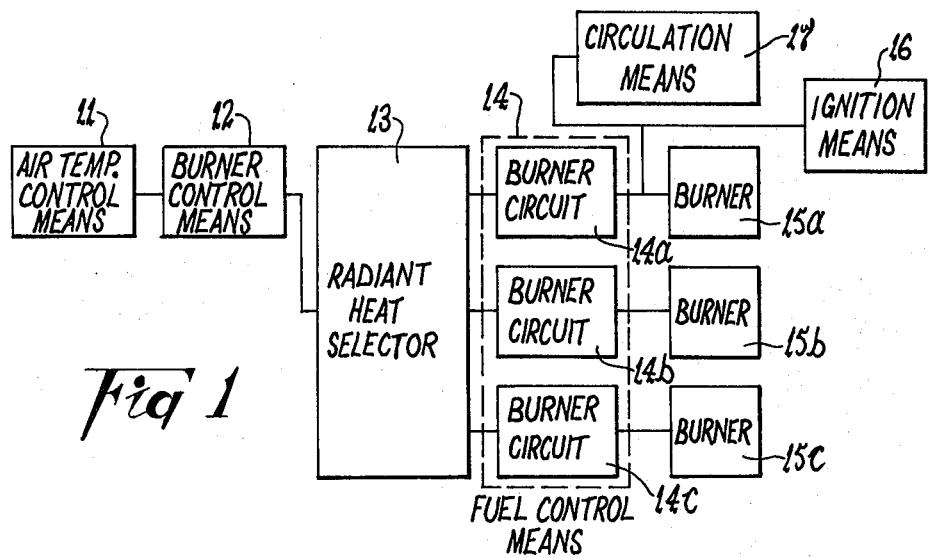
FIG. 1 is a block diagram of one form of control system according to the present invention.

Referring to FIG. 1 an air temperature control means 11 is connected to burner control means 12. The burner control means 12 is connected to a fuel control means 14 via a radiant heat selector 13. The fuel control means 14 shown in FIG. 1 incorporates three burner circuits 14A, 14B and 14C, the burner circuits being connected to their respective burners 15A, 15B and 15C. A circulation means 17 and ignition means 16 are connected to the output of burner circuit 14A. Preferably the circulation means 17 and ignition means 16 are actuated whenever one or more of the burners 15A–C are actuated by the fuel control means 14.

Figure 2:
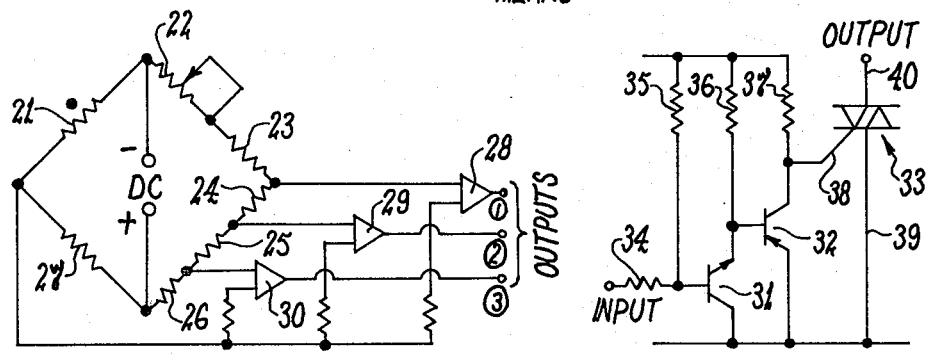
FIG. 2 is a schematic diagram of a preferred form of air temperature control means suitable for use in the control system of the present invention.

The air temperature control means shown in FIG. 2 comprises a wheatstone bridge circuit. A first arm of the bridge comprises a thermister 21 and constitutes the temperature responsive element. A second arm of the bridge comprises resistive elements 22 and 23, resistive element 22 being variable and constituting the variable target control element. A third arm of the bridge comprises resistive elements 24, 25 and 26. The junctions of elements 23–24, 24–25 and 25–26 form respective tapping points from which a plurality of outputs may be derived from the bridge. The fourth arm of the bridge comprises a resistive element 27. In operation, a steady D.C. voltage may be applied to the bridge at the junctions of elements 21–22 and 26–27 respectively. Preferably the positive polarity of the D.C. voltage is applied to the junction of elements 26–27. As may be appreciated, if the junction of elements 21–27 is taken as a reference, the voltage at the junctions formed by elements 23–24, 24–25 and 25–26 passes through successive null or balance points as the resistance of one or more of the elements 21 and 22 changes.

To detect the occurrence of null or balance voltages at these junctions differential amplifiers 28, 29 and 30 are provided. One input of each differential amplifier is connected between the junction of elements 21–27 and the other input of each amplifier is connected between the junctions of elements 23–24, 24–25 and 25–26 respectively as shown in FIG. 2. The outputs of differential amplifiers 28, 29 and 30 may be arranged to switch from a positive to negative potential upon the occurrence of a null or balance voltage at the junctions of elements 23-24, 24-25 and 25-26 respectively. As the resistance of elements 21 and/or 22 move further out of balance it may be seen that the outputs of differential amplifiers 28, 29 and 30 will change state successively. The amplifiers will change back to their original states when the resistance of elements 21 and 22 are returned to balance.

Figure 3:
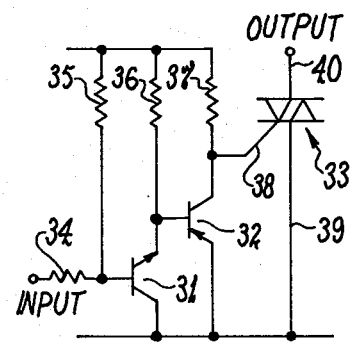
FIG. 3 is a schematic diagram of one form of burner circuit which may be incorporated in the fuel control means.

Each output of the differential amplifiers 28-30 may trigger a burner control circuit as shown in FIG. 3. The burner control circuit may include switching transistors 31 and 32, biassed appropriately by resistance elements 34-37, and an SCR element 33 having a gate electrode 38, an input electrode 39 and an output electrode 40, interconnected as shown. It may be seen that an appropriate signal at the base electrode of transistor 31 will trigger the transistor 31 into conduction, this will cause transistor 32 to be triggered into conduction which in turn will provide a trigger voltage at the gate electrode 38 of the SCR 33 causing the output electrode 40 to be shorted to the input electrode 39. The SCR 33 may thus be adapted to switch the solenoids of fuel valves corresponding to a burner associated with the particular burner control circuit. The fuel valves are preferably actuated from a mains AC voltage supply. If two fuel valve solenoids are to be switched by a single burner control circuit it is preferred that one solenoid is switched on the positive cycle of the mains supply whilst the other solenoid is switched on the negative cycle of the main supply. This arrangement minimizes D.C. voltage feedback to the AC mains supply.

Figure 4:
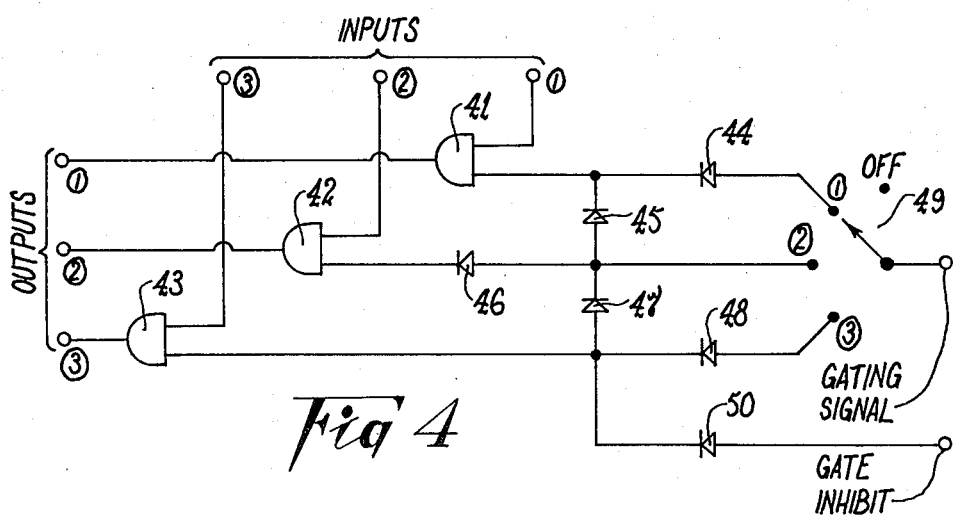
FIG. 4 is a schematic diagram of one preferred form of radiant heat selector according to the present invention.

FIG. 4 shows one particular form of radiant heat selector according to the present invention which selector is interposed, in the embodiment shown by FIG. 1, between the outputs of the air temperature control means exemplified in FIG. 2 and the burner control circuit exemplified in FIG. 3. The radiant heat selector includes three AND gates 41, 42 and 43. One input electrode of each gate respectively constitutes the inputs of the radiant heat selector, which inputs are adapted to receive the outputs of the air temperature control means. The output of each gate is adapted to trigger a burner control circuit. The second or controlling electrode of each AND gate is connected respectively to a gating signal distributed by a rotary switch 49 via a plurality of steering diodes 44-48. It may be seen that the arrangement of the steering diodes is such that when the rotary switch 49 is in the position marked 1 the gating signal will arrive only at the controlling electrode of gate 41, the diodes 45 and 47 blocking the gating signal from gates 42 and 43. When the rotary switch is in position 2 the gating signal reaches gates 41 and 42 and when at position 3 the gating signal reaches all three gates 41-43. The rotary switch thus enables one, two or three gates as required. An off position may be provided on the rotary switch for switching off the heating control system. In one preferred form the gating signal may be supplied by a touch control Integrated Circuit switching device as previously described. The touch control switching device may include a plurality of output electrodes and a corresponding number of input electrodes and may be arranged so that a respective output electrode of the switching device supplies the gating signal to the input of diode 44, 46 or 48 as required. A gating signal is applied to a particular diode when an output electrode corresponding to that diode is actuated by the corresponding input electrode.

A further diode 50 may be included in the radiant heat selector as shown to inhibit the gates 41-43 thereby effectively blocking signals from the air temperature control means 11 to the burner control means 13. The gate inhibit signal to the diode 50 may be provided by a timer switch which can be used to effectively switch off the entire control circuit without switching off power to the control circuit. This has the advantage that a given setting on the radiant heat selector is not lost as might be the case if power were disconnected.

Figure 5:
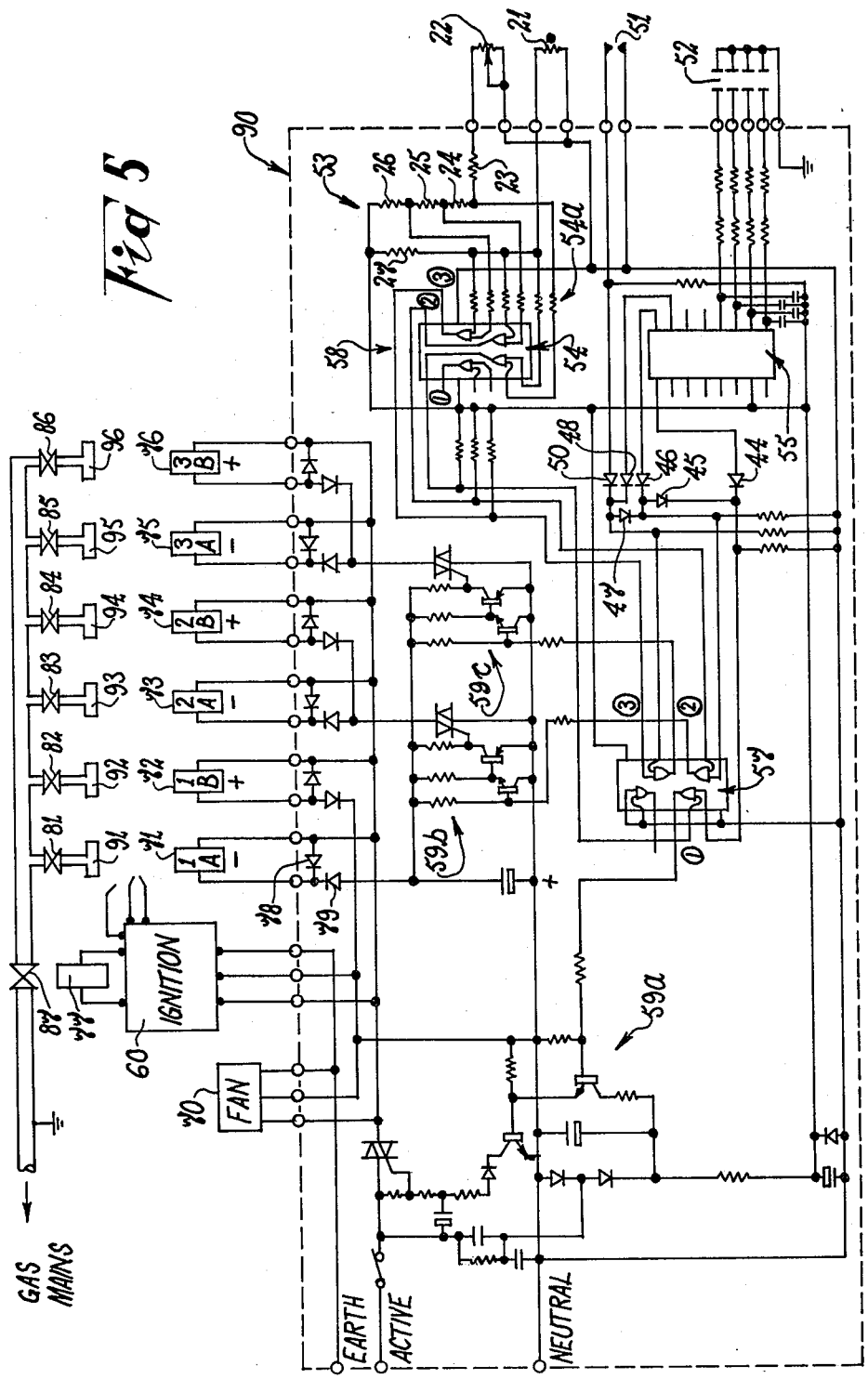
FIG. 5 is a schematic diagram of a complete heating system incorporating one form of control system in accordance with a preferred embodiment of the present invention.

FIG. 5 shows a heating system incorporating a control device 90 in accordance with a preferred form of the present invention. The control device 90 is shown connected to an ignition device 60 and an electric fan 70 for circulating heated air. A plurality of gas valve solenoids 71-76 are connected to the control device for activating corresponding gas valves 81-86 to supply gas to respective burner heads 91-96. A supply valve 87 may be operated by solenoid 77 to control the supply of gas to the heating system and to act as a supply cut-off device in case of ignition-failure or in an emergency.

A target temperature control element 22 and thermister 21 are connected to the control device 90 as shown. An air temperature control circuit is shown generally at 53 and includes a bridge circuit comprising resistor 23-27 as well as the elements 21 and 22 as previously described.

The burner control means is shown generally at 58 and includes an Integrated Circuit package 54. The package 54 conveniently carries at least three differential amplifiers. The package 54 may, for example, be a quad operational amplifier package such as a circuit type LM339.

The radiant heat selector of the control device comprises a touch control switching circuit 55 connected via steering diodes 44-48 to a plurality of AND gates shown at 57. A plurality of electrodes 52 are connected to the switching circuit 55 to serve as selector switches for the radiant heat selector. The touch control switching circuit preferably is of the circuit type SN 29861 previously referred to. The function of the steering diodes 44-48 is as previously described in relation to FIG. 4. Diode element 50 provides an inhibit function for the control circuit as described. Diode element 50 is connected to a pair of contacts 51 which remain closed while the control circuit is in operation. The contacts 51 are preferably operated by a 24 hour timer switch mechanism (not shown) which may serve to switch the control device 90 on and off as required.

The AND gates shown at 57 may conveniently be provided on a quad AND gate integrated circuit package such as a circuit type HEF 4081B.

The burner control circuits are shown generally at 59A, 59B and 59C. The function and construction of the burner control circuits is generally as described in relation to FIG. 3. As may be seen, the burner control circuits 59A, 59B and 59C are connected to drive value solenoids pairs 71-72, 73-74 and 75-76 respectively. A pair of diodes, exemplified at 78 and 79, are connected to each of the solenoids 71-76 with alternating reversed polarities to ensure that switching of adjacent solenoids occurs on opposite polarity of the mains power supply waveform. This arrangement minimizes D.C. voltage feedback to the mains supply.

In the operation of the preferred heater system of FIG. 5 whenever the elements 21 and 22 reflect a temperature "difference," the air temperature control circuit 53 actuates one or more of differential amplifiers 54 of the burner control means 58. Without the intervention of the radiant heat selector, signals from the burner control means 58 pass through gates 57 to actuate one or more of the burner control circuits 59A, 59B and 59C as required by the burner control means 58. The burner control circuits are arranged to be actuated in sequence so that burner circuit 59A will be the first circuit to be actuated and so forth. A large temperature "difference" will generally lead to a large number of burner circuits being actuated.

Burner control circuit 59A controls gas flow at burner heads 91 and 92 by actuating solenoids 71 and 72 of gas valves 81 and 82. The control circuit additionally actuates ignition device 60 to ignite gas emitted from the burner heads. The fan 70 is also actuated by the control circuit 59A to circulate heated air when the burner heads are ignited.

The radiant heat selector in FIG. 5 may advantageously be actuated when a large number of burners is operating. The operation of a large number of burners may lead to discomfort as a result of the large radiant heat component associated with operation of the burners.

The radiant heat selector is actuated by selecting one of the electrodes 52. The electrodes 52 enable gates 57 via the switching circuit 55 and steering diodes 44–48. It may be seen that the maximum number of burner control circuis and associated burners may thus be limited by the radiant heat selector. As the number of burners operating at any given time is in proportion to the radiant heat component output of the heating system, it may be seen that the radiant selector will effectively limit radiant heat output to a preselected maximum level.

The present invention provides effective control of heat discharge into a space by radiation/convection means at the same time providing for the radiation component of the discharge to be separately controlled.

It will be understood that various modifications, alterations, and/or additions may be introduced into the construction of parts previously described without departing from the spirit or ambit of the present invention.

Having now described our invention, what we claim as new and desire to secure by Letters Patent is:

1. A control system for a heating arrangement including:
    control means for controlling the heat output of the heating arrangement so as to heat a space to a preselected target air temperature, said control means comprising:
        air temperature control means for providing at least one output indicative of a difference between an existing air temperature and said preselected target air temperature,
        burner control means connected to said air temperature control means so as to receive said at least one output, and
        fuel control means, connected to said burner control means, for controlling the fuel supply of the heating arrangement under the control of said burner control means; and
    limiting means for limiting the radiant heat output of the heating arrangement by constraining the operation of said control means while simultaneously allowing some said heat output to heat the space to said target air temperature, said limiting means comprising a radiant heat selector connected to said fuel control means and operable to limit the operation of said fuel control means under the control of said burner control means so that the heat output of the heating arrangement enables said target air temperature to be approached but the radiant heat output of the heating arrangement is limited to a predetermined level.

2. A control system according to claim 1 wherein said fuel control means comprises at least one burner circuit adapted to control respective burners of the heating arrangement.

3. A control system according to claim 2 including circulation means for circulating heated air within the environment being heated.

4. A control system according to claim 3 wherein said circulation means is activated by said fuel control means.

5. A control system according to claim 4 wherein said circulation means is actuated whenever a burner is operating.

6. A control system according to claim 5 wherein said circulation means comprises an electrically powered fan.

7. A control system according to claim 2 including ignition means for igniting at least one burner.

8. A control system according to claim 7 wherein said ignition means is activated whenever fuel commences to flow through one or more burners.

9. A control system according to claim 2 wherein each burner circuit is operably connectable to one or more fuel actuating means.

10. A control system according to claim 9 wherein each said fuel actuating means comprises a solenoid valve.

11. A control system according to claim 9 wherein each burner circuit is operably connected to a pair of fuel actuating means.

12. A control system according to claim 1 wherein said air temperature control means includes a temperature responsive element and a target temperature control element.

13. A control system according to claim 1 wherein said air temperature control means comprises a wheatstone bridge circuit including a temperature responsive element and a target temperature control element.

14. A control system according to claim 13 wherein said temperature responsive element comprises a thermister and said target temperature control element comprises a potentiometer included in respective first and second arms of the bridge.

15. A control system according to claim 14 wherein one or more resistance elements forming a voltage divider with said second arm is provided in a third arm of the bridge and a further resistance element forming a voltage divider with said first arm is provided in a fourth arm, the junction of said resistance elements in said third arm constituting said at least one output of said air temperature control means.

16. A control system according to claim 1 wherein said burner control means comprises one or more voltage comparators.

17. A control system according to claim 16 wherein each said voltage comparator comprises a differential amplifier.

18. A control system according to claim 16 wherein each voltage comparator receives an output of said temperature control means.

19. A heating arrangement incorporating a control system according to claim 1.

20. A control system according to claim 1 wherein said radiant heat selector includes at least one gate between the output of the burner control means and the fuel control means.

21. A control system according to claim 20 wherein said at least one gate is adapted to receive at its first input an output of the burner control means and at its second input a gating signal from a control switch of the radiant heat selector, said at least one gate being arranged such that signals from the burner control means will pass through said gate only when coincident with said gating signal.

22. A control system according to claim 20 wherein said at least one gate comprises a two input AND gate.

23. A control system according to claim 21 wherein said control switch comprises a plurality of steering diodes and a selector supplying the gating signal.

24. A control system according to claim 23 wherein said selector comprises a rotary switch.

25. A control system according to claim 23 wherein said selector comprises an integrated circuit switching device having touch control switching inputs.

* * * * *